Patented Oct. 30, 1945

2,387,920

UNITED STATES PATENT OFFICE 2,387,920

MANUFACTURE OF INHIBITORS

Charles D. Lowry, Jr., Chicago, Ill., assignor to Universal Oil Products Company, Chicago, Ill., a corporation of Delaware No Drawing. Application January 18, 1943, Serial No. 472,751

3 Claims. (Cl. 260—627)

This invention relates to the manufacture of inhibitors from certain types of tar fractions which contain phenols and aryl alkyl ethers in admixture with compounds relatively inactive from an inhibitor standpoint, such as hydrocarbons.

The invention is more specifically concerned with a process for the treatment of such tars or tar fractions as may be obtained in the distillation of various woods to obtain phenolic mixtures which have high inhibiting potency when used in minor amounts in various materials subject to deterioration on account of their unsaturated character which leads to their polymerization and/or oxidation.

It is known in the various arts in connection with organic materials which are subject to deterioration on standing under oxidizing conditions that various compounds of a phenolic character serve to inhibit the changes in such substances when used in relatively small amounts, generally of the order of less than 1 per cent by weight. Thus, various phenols and their alkylated derivatives are known to possess marked inhibiting properties when used in organic compounds or mixtures of an unsaturated and unstable character. In accordance with the present process, phenolic mixtures of high inhibiting potency are produced by the treatment of tars and tar fractions produced in distillation of woods and particularly in the distillation of the so-called hard woods as distinguished from the soft woods or coniferous varieties. Thus, the materials to be treated by the present process are formed by the distillation of such woods as beech and maple as representing the so-called class of hard woods.

In one specific embodiment, the present invention comprises a process for the manufacture of inhibitors from wood tars or similar materials which consists in treating said materials with hydrogen halides such as hydrogen chloride, hydrogen bromide or hydrogen iodide to form corresponding methyl halides by reaction with methyl groups in aryl-metyl ethers, separating the methyl halides, treating with alkalies to dissolve phenols and recovering phenols by acidifying the alkali solutions thereof.

Aniline may be used with hydrogen chloride or hydrogen bromide to accelerate the demethylating reactions. The use of this compound is usually essential when hydrogen chloride is used, although it is not always necessary when employing hydrogen bromide. Hydrogen iodide will react in the absence of aniline.

Wood tars and similar materials contain in addition to compounds of a distinctly phenolic character considerable amounts of methyl ethers of phenols, these ethers having low inhibiting activity. By the present process these ethers are converted into phenols and the phenols thus produced along with those originally present in the tar fraction are separated by dissolving them in an aqueous alkali, removing the solution from the non-phenolic residual tar and subsequently liberating the dissolved phenols by the acidification of the aqueous solution. In this way, a highly phenolic concentrate is obtained which has been found to have high inhibiting potency in preventing the deterioration of such unstable materials as cracked gasolines, olefin mixtures containing diolefins, diolefins themselves such as butadiene, aryl substituted olefins such as styrene and other mixtures of organic materials which tend to polymerize on standing under oxidizing influences.

In the dealkylating step of the process a tar or tar fraction is placed in a reaction vessel of glass, glass lined, or non-ferrous material; heated to a reaction temperature and subjected to the action of a hydrogen halide. Aniline is used with the hydrogen chloride as a means of accelerating the rate of reaction in the formation of methyl chloride from the ethers, its use being sometimes unnecessary if hydrogen bromide is employed for this purpose. In place of aniline other aromatic amines such as toluidines and xylidines, etc., may be used. The preferred materials, however, from a practical standpoint are hydrogen chloride and aniline on account of the ready availability of these two substances and their positive action in bringing about the desired dealkylating reactions. While hydrogen bromide is sufficiently active to dealkylate the ethers without the use of aniline, this compound is more expensive and not generally preferred except in special instances. Aniline may be considered as a transfer medium or catalyst to promote the desired dealkylation reactions.

Temperatures employed when hydrogen chloride and aniline are used to dealkylate the ethers may vary from about 100 to about 200° C. and it is preferred to conduct operations according to the batch procedure since times of considerable length of the order of from 1 to 2 hours are essential in order to cause the ethers to react completely and produce high yields of corresponding phenols.

The dealkylation reactions may be brought about alternatively by using relatively dilute aqueous solutions of hydrogen chloride of less than 20 percent weight concentration. In such cases temperatures of the order of 200° C. and pressures around 300 pounds per square inch give good results.

After the dealkylating reaction is complete as indicated by no further formation of methyl halide, the total reactants may be added to an aqueous solution of an alkali metal hydroxide such as, for example, 10 to 30 per cent aqueous solution of sodium hydroxide and the products will then separate into a lower layer comprising an aqueous solution of the alkali metal phenolates and an upper layer of a hydrocarbon character containing aniline which was separated by the action of the alkali metal hydroxide on the aniline hydrochloride present in the reaction mixture. The aniline may be recovered by distillation from the other caustic-insoluble materials and reused in the dealkylating step. The total phenols may be recovered by acidifying the phenolate solution by mineral acids such as hydrochloric and sulfuric acids, or by treatment with carbon dioxide.

The invention may be applied with special advantage to the treatment of hard wood tar fractions boiling within the approximate range of 200 to 300° C., since this particular boiling range material contains relatively large amounts of phenols and their alkyl ethers, particularly methyl ethers. In the dealkylating step it is sometimes advantageous to employ a solvent or diluent for the tars, or tar fractions to reduce their viscosity and insure more effective contact with the halogen acid employed for the dealkylation. A suitable solvent is acetic acid which dissolves both tars and halogen acids or their aqueous solutions and enables treatments to be conducted under substantially single phase conditions. Thus, for example, a fraction of a wood tar may be dissolved in about 4 to about 5 volumes of glacial acetic acid and the dealkylation brought about by the use of a concentrated aqueous solution of hydrobromic acid, the total mixture being gently heated under refluxing conditions or under a slight superatmospheric pressure.

When employing hydrogen chloride or hydrogen bromide, these compounds may be introduced under the surface of the heated tar which is dissolved in solvents of the character indicated. This method permits more careful control of the reactions than when aqueous solutions are added en masse. After the phenols have been recovered by the acidification of the aqueous phenolate solutions, they may be used as such in inhibiting deterioration of unstable materials or they may be fractionated into cuts having specific inhibiting activities. Such phenolic mixtures have been found to be especially valuable in preventing deterioration of cracked gasolines and of such readily polymerizable materials as butadiene and styrene which are used in the manufacture of high boiling polymeric substances having physical properties similar to those of natural rubber.

The following examples are given to illustrate the type of results obtainable in practicing the invention, but they are not intended to unduly circumscribe the proper scope of the invention in accordance with the specific data which are presented.

Example 1

42 parts by weight of a wood tar fraction boiling between about 215 and 240° C. was dissolved in about 200 parts by weight of glacial acetic acid, 60 parts by weight of 48 per cent aqueous hydrobromic acid was added and the solution was heated at a temperature of about 120° C. for a period of 1 hour during which time a considerable evolution of methyl bromide was observed. The liquid reaction products were then cooled, the acetic acid was recovered by distillation and the residual material neutralized with an aqueous solution of caustic soda to form a two layer system, the lower layer comprising an aqueous solution of sodium phenolates and the upper layer comprising hydrocarbons and neutral substances. The phenolate solution was separated and treated with carbon dioxide to liberate phenols and these were recovered as an upper layer in an amount equal to about 75 per cent by weight of the original wood tar fraction.

The mixture of phenols produced by this method was tested as to its inhibiting potency by using it in the amount of 0.025 per cent in a cracked paraffinic gasoline which showed an "induction period" of approximately 100 minutes when uninhibited. When the phenolic fraction was added to the gasoline the "induction period" was raised to 980 minutes, indicating a marked increase in stability of the cracked gasoline.

Example 2

100 parts by weight of a wood tar cut boiling about 240-280° C. was mixed with 20 parts by weight of aniline hydrochloride and heated in an oil bath at temperatures beginning at 180 and ending at 210° C. during a period of 1½ hours, with slow addition of hydrogen chloride. There was considerable evolution of methyl chloride. The products were treated with a 20 per cent aqueous solution of caustic soda to extract the total phenols, the undissolved materials were separated, the aniline recovered by distillation, and the alkali solution treated with sulphuric acid to liberate the phenols from the phenolates. The inhibiting value of the wood tar cut when added to a cracked paraffinic gasoline in an amount of 0.025 weight per cent of the gasoline was shown by the "induction period" of 345 minutes obtained when the gasoline containing the wood tar cut was tested by standard procedure. When the phenolic mixture produced by treating the wood tar cut according to the present process was added to another portion of the same gasoline in the same amount that was used in the untreated wood tar, the "induction period" was found to be 800 minutes.

I claim as my invention:

1. A method for increasing the inhibiting potency of a phenolic wood tar fraction containing aryl-methyl ethers, which comprises reacting said fraction with a hydrogen halide in the presence of aniline at a temperature of from about 100° C. to about 200° C. to convert the ethers to phenols, and recovering a phenolic concentrate from the reaction mass.

2. A method for increasing the inhibiting potency of a phenolic wood tar fraction containing aryl-methyl ethers, which comprises reacting said fraction with a hydrogen chloride in the presence of aniline at a temperature of from about 100° C. to about 200° C. to convert the ethers to phenols, and recovering a phenolic concentrate from the reaction mass.

3. A process for the production of phenolic mixtures useful as inhibitors of the deterioration of unsaturated compounds which comprises causing a wood tar fraction containing aryl-methyl ethers to react with hydrogen chloride in the presence of aniline at a temperature of from about 100 to about 200° C. to form methyl chloride and thereby substantially dealkylate said ethers, subjecting the treated wood tar fraction to treatment with a solution of an alkali metal hydroxide to form a solution containing alkali metal phenolates dissolved therein, separating said solution from neutral oils and aniline, recovering phenols from said solution by acidification thereof, separating aniline from said neutral oils and recycling said aniline to further use.

CHARLES D. LOWRY, Jr.